United States Patent
Liu et al.

(10) Patent No.: US 12,032,254 B2
(45) Date of Patent: Jul. 9, 2024

(54) DISPLAY SUBSTRATE, DISPLAY PANEL AND DISPLAY APPARATUS

(71) Applicants: Hefei BOE Display Technology Co., Ltd., Anhui (CN); BOE Technology Group Co., Ltd., Beijing (CN)

(72) Inventors: Qi Liu, Beijing (CN); Wei Zhang, Beijing (CN); Zhenkun Yu, Beijing (CN); Benzhi Xu, Beijing (CN); Jilei Gao, Beijing (CN); Xipeng Wang, Beijing (CN); Yonggang Zhang, Beijing (CN); Bin Li, Beijing (CN); Chao Li, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/922,466

(22) PCT Filed: Feb. 19, 2021

(86) PCT No.: PCT/CN2021/076818
§ 371 (c)(1),
(2) Date: Oct. 31, 2022

(87) PCT Pub. No.: WO2021/223488
PCT Pub. Date: Nov. 11, 2021

(65) Prior Publication Data
US 2023/0176434 A1    Jun. 8, 2023

(30) Foreign Application Priority Data
May 6, 2020  (CN) .......................... 202010372827.0

(51) Int. Cl.
G02F 1/1362  (2006.01)

(52) U.S. Cl.
CPC .............................. *G02F 1/136286* (2013.01)

(58) Field of Classification Search
None
See application file for complete search history.

(56) References Cited

U.S. PATENT DOCUMENTS 6,259,493 B1 * 7/2001 Nakamura ........ G02F 1/136286
349/138
11,126,040 B2 * 9/2021 Yadin .................. G02F 1/13439
(Continued)

FOREIGN PATENT DOCUMENTS

| CN | 102736339 A | 10/2012 |
| CN | 103698951 A | 4/2014 |

(Continued)

OTHER PUBLICATIONS

CN202010372827.0 first office action.
(Continued)

*Primary Examiner* — Ryan Crockett
(74) *Attorney, Agent, or Firm* — IPro, PLLC (57) ABSTRACT

A display substrate, a display panel and a display apparatus. The display substrate including: a substrate having a display area; a plurality of sub-pixels arranged in an array and located in the display area of the substrate; and a plurality of data lines arranged in the display area of the substrate; the plurality of data lines extend in a column direction of the sub-pixels, and a column of sub-pixels are electrically connected with at least one of the plurality of data lines; and for at least one of the plurality of data lines, a side of an orthographic projection of the at least one of the plurality of data lines on the substrate facing orthographic projections of sub-pixels electrically connected with the at least one of the plurality of data lines has a plurality of first concave-convex structures.

11 Claims, 5 Drawing Sheets

(56) References Cited

U.S. PATENT DOCUMENTS

| | | | |
|---|---|---|---|
| 11,644,726 B1* | 5/2023 | Lin | G02F 1/134327 |
| | | | 257/773 |
| 2003/0227591 A1* | 12/2003 | Liu | G02F 1/136209 |
| | | | 349/143 |
| 2012/0257154 A1* | 10/2012 | Park | G02F 1/133784 |
| | | | 349/142 |
| 2016/0004128 A1* | 1/2016 | Wu | G02B 30/27 |
| | | | 349/144 |
| 2017/0102575 A1* | 4/2017 | Yasukawa | G02F 1/13394 |
| 2018/0011357 A1* | 1/2018 | Lee | G02F 1/136286 |
| 2019/0096911 A1* | 3/2019 | Li | G02F 1/136286 |
| 2021/0074774 A1* | 3/2021 | Su | H10K 59/131 |
| 2021/0118908 A1* | 4/2021 | Song | G02F 1/136286 |
| 2021/0132449 A1* | 5/2021 | Shao | G02F 1/1362 |
| 2022/0244604 A1* | 8/2022 | Liao | G02F 1/1368 |

FOREIGN PATENT DOCUMENTS

| | | |
|---|---|---|
| CN | 104483790 A | 4/2015 |
| CN | 106773394 A | 5/2017 |
| CN | 107479245 A | 12/2017 |
| CN | 207148492 U | 3/2018 |
| CN | 108983518 A | 12/2018 |
| CN | 111443542 A | 7/2020 |
| CN | 112782896 A | 5/2021 |
| KR | 20060114918 A | 11/2006 |
| TW | 548452 B | 8/2003 |

OTHER PUBLICATIONS

CN202010372827.0 second office action.
CN202010372827.0 Decision of Rejection.
PCT/CN2021/076818 international search report.

* cited by examiner

DISPLAY SUBSTRATE, DISPLAY PANEL AND DISPLAY APPARATUS

CROSS REFERENCE TO RELATED APPLICATIONS

The present disclosure claims the priority to Chinese Patent Application No. 202010372827.0, filed to the China National Intellectual Property Administration on May 6, 2020 and entitled "ARRAY SUBSTRATE, DISPLAY PANEL AND DISPLAY APPARATUS", which is incorporated in its entirety herein by reference.

FIELD

The present disclosure relates to the technical field of displaying, and in particular to a display substrate, a display panel, and a display apparatus.

BACKGROUND

As a display technology rapidly advances, a thin film transistor-liquid crystal display (TFT-LCD for short) has gradually become a mainstream product for its light weight, small size, low power consumption, non-radiation, high display resolution, etc. Owing to the limitation of a TFT-LCD producing and manufacturing process, a coupling capacitance between a data line and a pixel electrode has great influence on picture quality.

SUMMARY

A display substrate is provided in embodiments of the present disclosure and includes:
a substrate having a display area;
a plurality of sub-pixels arranged in an array and located in the display area of the substrate; and
a plurality of data lines arranged in the display area of the substrate, where the plurality of data lines extend in a column direction of the sub-pixels, and a column of sub-pixels are electrically connected with at least one of the plurality of data lines, and for at least one of the plurality of data lines on the substrate, a side of an orthographic projection of the at least one of the plurality of data lines on the substrate facing orthographic projections of sub-pixels electrically connected with the at least one of the plurality of data lines has a plurality of first concave-convex structures.

Optionally, in the embodiments of the present disclosure, a side of an orthographic projection of the at least one of the plurality of data lines on the substrate facing away from the orthographic projections of sub-pixels electrically connected with the at least one of the plurality of data lines has a plurality of second concave-convex structures.

Optionally, in the embodiments of the present disclosure, for a same data line, protrusions of the plurality of first concave-convex structures and protrusions of the plurality of second concave-convex structures are arranged correspondingly, and recesses of the plurality of first concave-convex structures and recesses of the plurality of second concave-convex structures are arranged correspondingly.

Optionally, in the embodiments of the present disclosure, for a same data line, protrusions of the plurality of first concave-convex structures and recesses of the plurality of second concave-convex structures are arranged correspondingly, and recesses of the plurality of first concave-convex structures and protrusions of the plurality of second concave-convex structures are arranged correspondingly.

Optionally, in the embodiments of the present disclosure, at least one of the first concave-convex structures and the second concave-convex structures is integrally formed along with the data line.

Optionally, in the embodiments of the present disclosure, in a same data line, distances between orthographic projections of centers of any two adjacent recesses in the plurality of the first concave-convex structures on the substrate are equal; and for a same data line, distances between orthographic projections of centers of any two adjacent recesses in the plurality of the second concave-convex structures on the substrate are equal.

Optionally, in the embodiments of the present disclosure, a pattern of orthographic projections of at least one of the first concave-convex structures and the second concave-convex structures on the substrate includes a rampart pattern, a fishbone pattern, a sawtooth waveform pattern and a wave pattern.

Optionally, in the embodiments of the present disclosure, orthographic projections of the plurality of second concave-convex structures on the substrate have a same pattern as orthographic projections of the plurality of first concave-convex structures on the substrate.

In another aspect, a display panel is further provided in the embodiments of the present disclosure and includes a display substrate and an opposing substrate opposite to the display substrate, and a liquid crystal layer packaged between the display substrate and the opposing substrate, the display substrate being the display substrate provided in the embodiments of the present disclosure.

In another aspect, a display apparatus is further provided in the embodiments of the present disclosure and includes the display panel provided in the embodiments of the present disclosure.

DETAILED DESCRIPTION OF THE EMBODIMENTS

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some rather than all of the embodiments of the present disclosure. Moreover, the embodiments of the present disclosure and features in the embodiments can be combined with one another without conflict. Based on the described embodiments of the present disclosure, all other embodiments obtained by those of ordinary skill in the art without creative efforts fall within the scope of protection of the present disclosure.

Unless otherwise defined, technical or scientific terms used in the present disclosure should have ordinary meaning as understood by those of ordinary in the art to which the present disclosure belongs. Words "first", "second" etc. used in the present disclosure do not denote any order, quantity, or importance, but are merely used for distinguishing between different components. "Comprise", "include" and similar words are intended to mean that an element or item in front of the word encompasses elements or items that are listed behind the word and equivalents thereof, but do not exclude other elements or items. "Connect", "connected" and similar words are not limited to a physical or mechanical connection, but can include an electrical connection, whether direct or indirect.

It should be noted that sizes and shapes of all figures in the accompanying drawings do not reflect true scales, and are merely intended to illustrate contents of the present disclosure. Moreover, the same or similar reference numerals denote the same or similar elements or elements having the same or similar function throughout.

A main structure of a thin film transistor-liquid crystal display (TFT-LCD) includes a display substrate and an opposing substrate opposite to each other, the display substrate is provided with a gate line, a data line, and a plurality of thin film transistors arranged in a array and a plurality of pixel electrodes arranged in array, a control signal applied to the gate line transmits a signal voltage on the data line to the pixel electrodes, and a required picture is displayed by controlling deflection of a liquid crystal.

Figure 1:
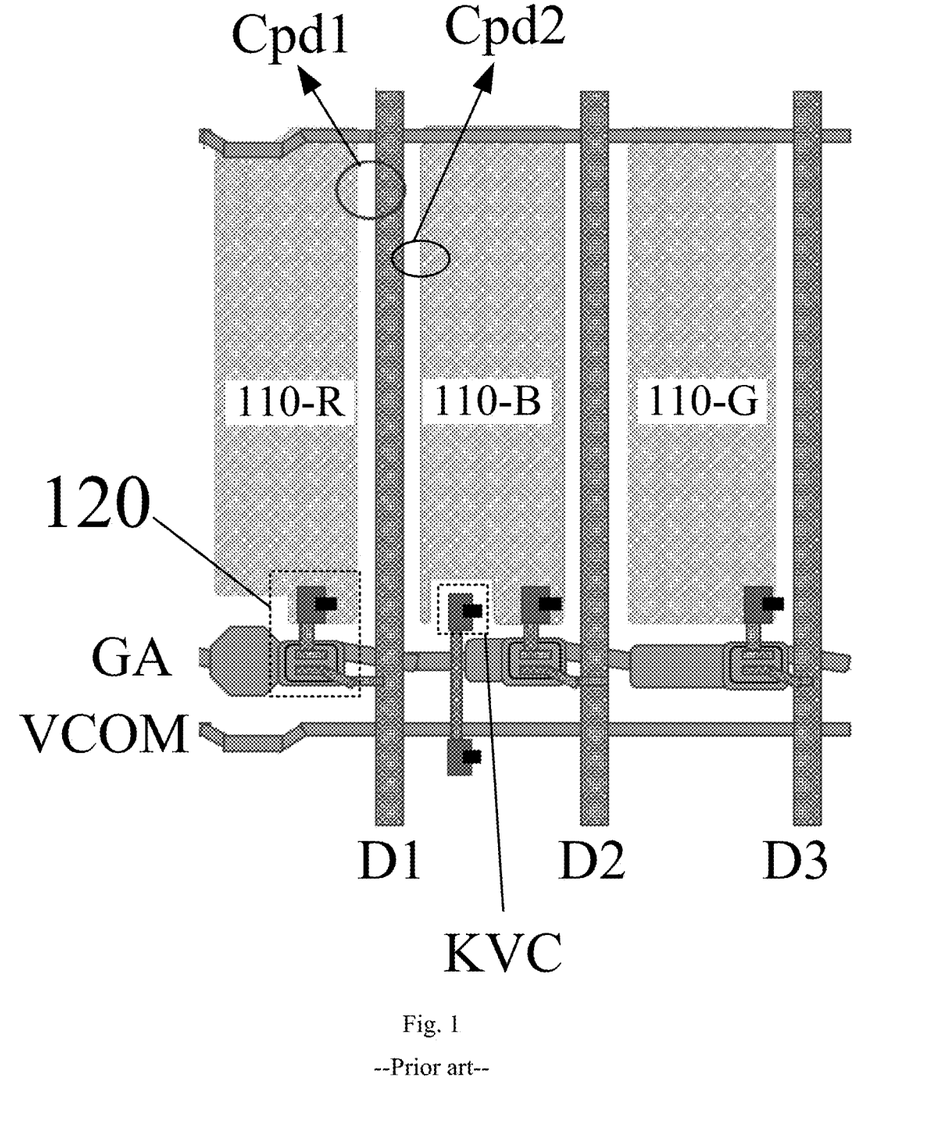
FIG. 1 is a schematic diagram of a specific structure of a display substrate in the related art.
Figure 2:
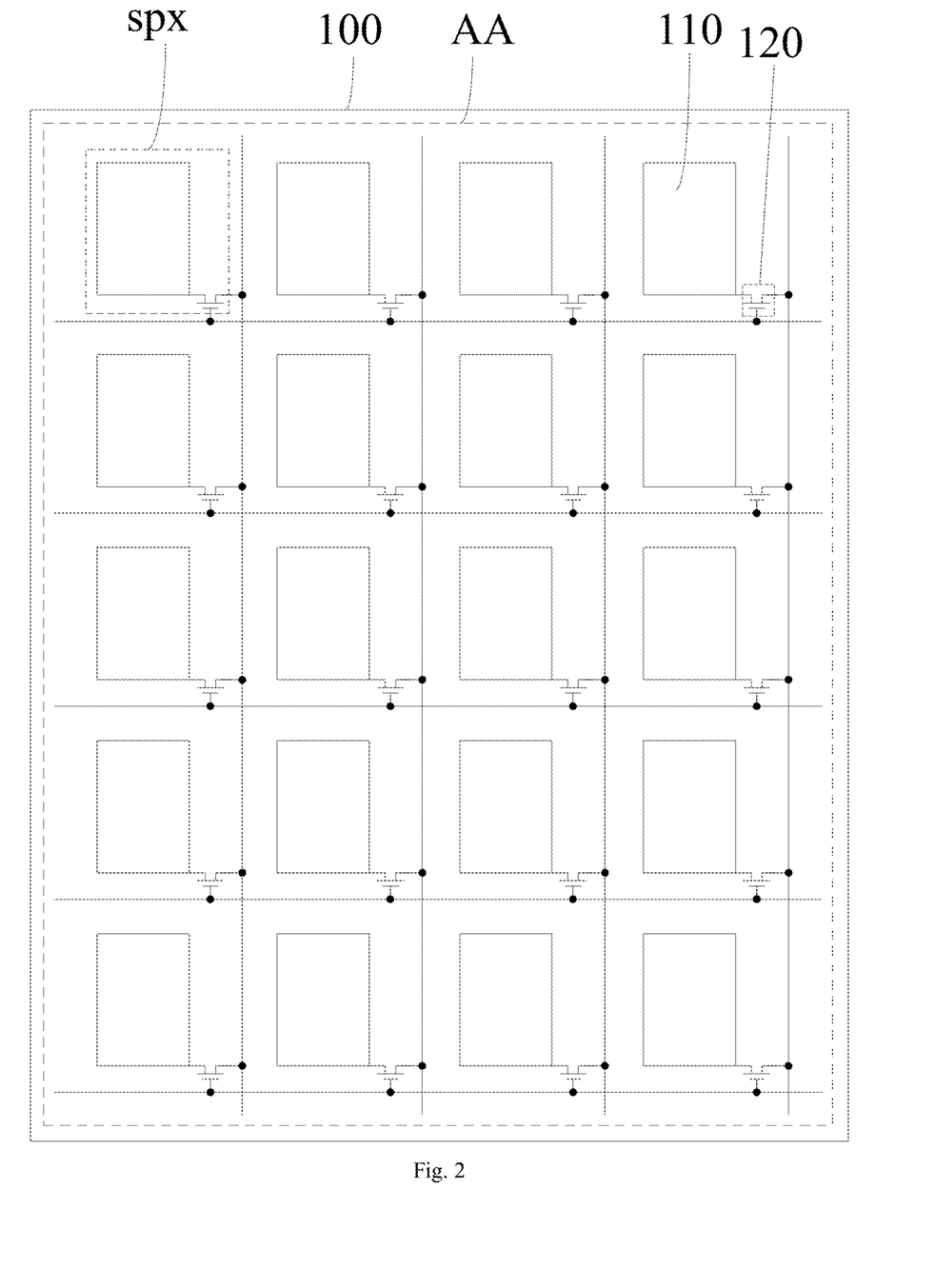
FIG. 2 is a schematic structural diagram of a display substrate provided in an embodiment of the present disclosure.

With increasingly higher resolution of the TFT-LCD and arrangement of a via hole KVC of a common electrode line VCOM, symmetrical design of the pixel electrodes on two sides of the data line in the TFT-LCD may not be implemented, such that coupling capacitances of the data line and the pixel electrodes on two sides are different. As shown in FIG. 1, the pixel electrode 110-R is electrically connected with the data line D1 via a corresponding thin film transistor, the pixel electrode 110-B is electrically connected with the data line D2 via a corresponding thin film transistor, and the pixel electrode 110-G is electrically connected with the data line D3 via a corresponding thin film transistor. The pixel electrode 110-R and the pixel electrode 110-B may not achieve symmetrical design, and the pixel electrode 110-B and the pixel electrode 110-G may not achieve symmetrical design. With the data line D1 as an example, in this way, a coupling capacitance Cpd1 between the data line D1 and the pixel electrode 110-R is greater than a coupling capacitance Cpd2 between the data line D1 and the pixel electrode 110-B. When polarity of a data signal is switched by the data line D1, voltages of the pixel electrode 110-R and the pixel electrode 110-B are pulled. When the display panel is driven in a column overturning mode, different pulls are generated on the voltages of the pixel electrode 110-R and the pixel electrode 110-B, such that the display panel is lightened or darkened, causing uneven image display.

In view of this, the embodiments of the present disclosure provide a display substrate. As shown in FIGS. 2 to 5, the display substrate may include: a base substrate 100, and a plurality of sub-pixels spx, a plurality of data lines and a plurality of gate lines arranged in a display area AA of the base substrate 100. a column of sub-pixels spx are electrically connected with at least one of the plurality of data lines. a row of sub-pixels spx are electrically connected with at least one of the plurality of gate lines GA. Moreover, the plurality of data lines extend in a column direction of the sub-pixels spx, and the plurality of gate lines extend in a row direction of the sub-pixels spx. Illustratively, one column of sub-pixels spx are electrically connected with one corresponding data line, and one row of sub-pixels spx are electrically connected with one corresponding gate line GA. Each sub-pixel spx includes a pixel electrode 110 and a thin film transistor 120. A gate of the thin film transistor 120 is electrically connected with the corresponding gate line GA, a source of the thin film transistor 120 is electrically connected with the corresponding data line, and a drain of the thin film transistor 120 is electrically connected with the pixel electrode 110. Moreover, as for at least one of the plurality of data lines, a side of an orthographic projections of the at least one of the plurality of data lines on the substrate 100 facing the orthographic projections of the sub-pixels spx electrically connected with the at least one of the plurality of data lines has a plurality of first concave-convex structures 130.

Specifically, in the display substrate provided by the embodiments of the present disclosure, since an distances between a pixel electrode 110 and a corresponding data line is inversely proportional to the magnitude of the coupling capacitance between the pixel electrode 110 and the corresponding data line, by arranging a plurality of first concave-convex structures 130 on the side of the orthographic projection of the at least one of the plurality of data lines on the base substrate 100 facing orthographic projections of sub-pixels electrically connected with the at least one of the plurality of data lines, the distances between the at least one of the plurality of data lines and the sub-pixels spx electrically connected thereto increase at recesses in the first concave-convex structures 130, such that the coupling capacitances between the the at least one of the plurality of data lines and the sub-pixels spx electrically connected thereto are reduced, so as to make the coupling capacitances between the at least one of the plurality of data lines and the sub-pixels spx electrically connected thereto approach, to the greatest possible extent, coupling capacitances between the at least one of the plurality of data lines and adjacent sub-pixels spx not electrically connected thereto, thereby reducing differences between the coupling capacitances between the at least one of the plurality of data lines and the sub-pixels spx electrically connected thereto and the coupling capacitances between the at least one of the plurality of data lines and the adjacent sub-pixels spx not electrically connected thereto, and improving the uniformity of picture display.

In some examples, the display substrate may include a plurality of pixel units, each of the plurality of may include a plurality of sub-pixels spx. Illustratively, each pixel unit may include a red sub-pixel spx, a green sub-pixel spx, and a blue sub-pixel spx, such that red, green and blue may be mixed to achieve color display. Alternatively, each pixel unit may further include a red sub-pixel spx, a green sub-pixel spx, a blue sub-pixel spx and a white sub-pixel spx, such that red, green, blue and white may be mixed to achieve color display. Certainly, in practical applications, a color of the sub-pixel spx in the pixel unit may be designed according to a practical application environment, which is not limited herein.

Figure 3:
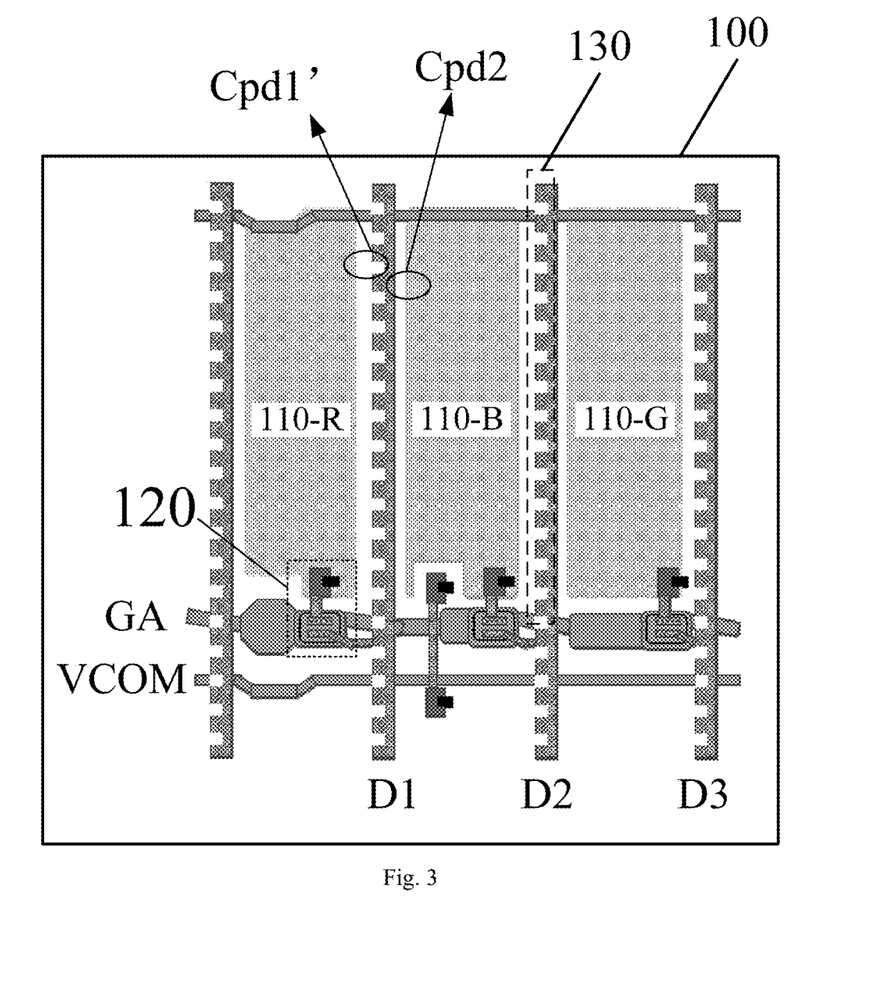
FIG. 3 is a schematic diagram of some specific structures of a display substrate provided in an embodiment of the present disclosure.

Illustratively, as shown in FIG. 3, each pixel unit may include a red sub-pixel spx, a green sub-pixel spx and a blue sub-pixel spx. The red sub-pixel spx may include a pixel electrode 110-R, the green sub-pixel spx may include a pixel electrode 110-G, and the blue sub-pixel spx may include a pixel electrode 110-B. Further, the pixel electrode 110-R is electrically connected with the data line D1 via a thin film transistor 120, the pixel electrode 110-G is electrically connected with the data line D3 via a thin film transistor 120, and the pixel electrode 110-B is electrically connected with the data line D2 via a thin film transistor 120. With the data line D1 as an example, since a side of the data line D1 facing the pixel electrode 110-R has a plurality of first concave-convex structures 130, a coupling capacitance Cpd1' between the data line D1 and the pixel electrode 110-R is reduced, that is, Cpd1'<Cpd1. Thus, a difference ΔCpd' between Cpd1' and Cpd2 may be reduced. Then, according to a formula:

$$\Delta V = \frac{\Delta C pd}{Cst + Clc + \Delta C pd},$$

a voltage pull difference ΔV of the data line D1 to the pixel electrode 110-R and the pixel electrode 110-B may further be reduced. Cst represents a storage capacitance of a pixel electrode, and Clc represents a liquid crystal capacitance.

Figure 4:
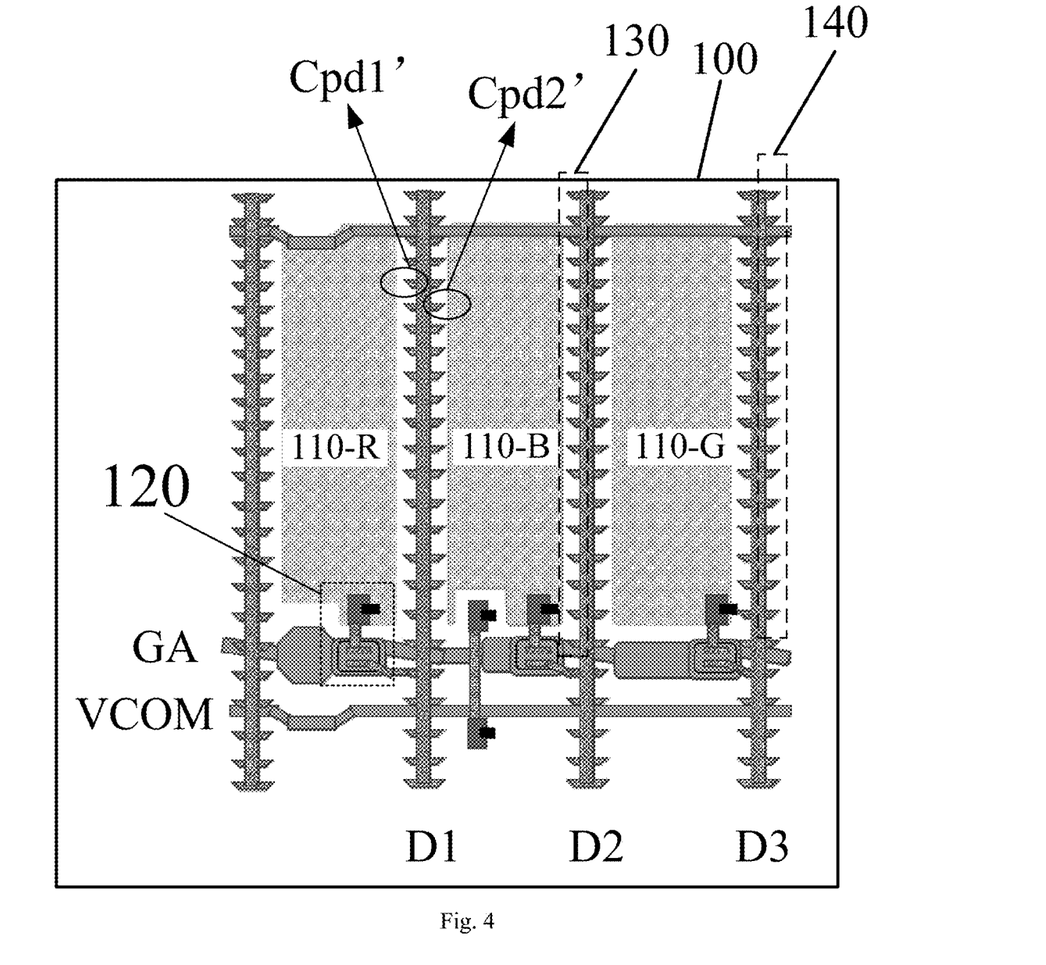
FIG. 4 is a schematic diagram of some other specific structures of a display substrate provided in an embodiment of the present disclosure.
Figure 5:
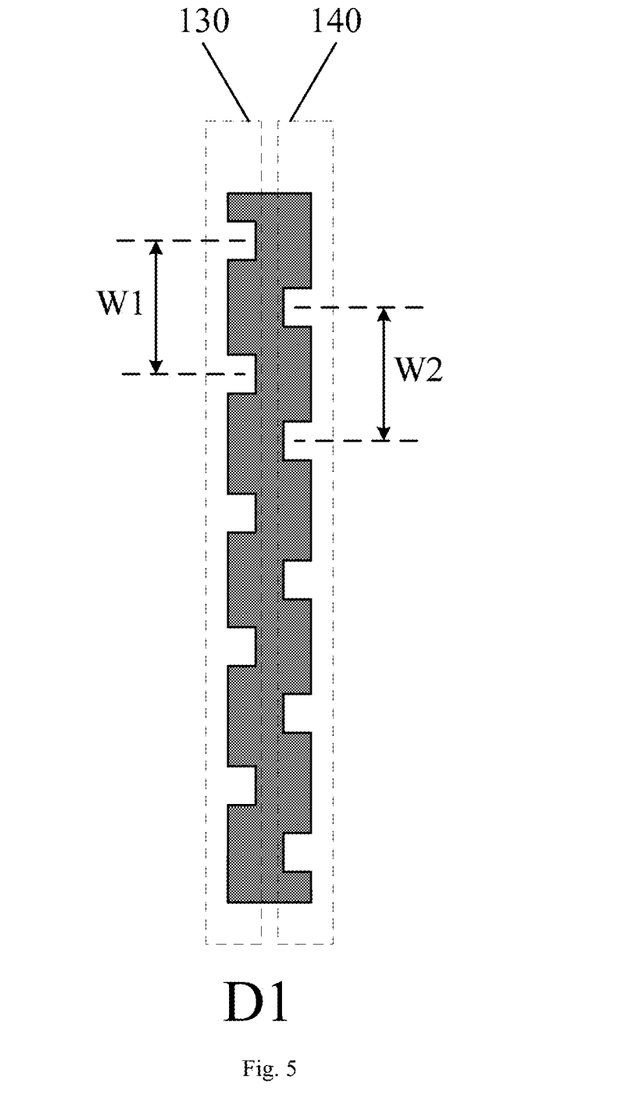
FIG. 5 is a schematic structural diagram of some data lines of a display substrate provided in an embodiment of the present disclosure.

Optionally, during specific implementation, in the embodiments of the present disclosure, as shown in FIGS. 4 and 5, a side of an orthographic projection of the at least one of the plurality of data lines on the substrate 100 facing away from the orthographic projections of the sub-pixels spx electrically connected with the at least one of the plurality of data lines has. Illustratively, with the data line D1 as an example, the side of the data line D1 facing the pixel electrode 110-R has a plurality of first concave-convex structures 130, the side of the data line D1 facing the pixel electrode 110-B has a plurality of second concave-convex structures 140, such that the coupling capacitance Cpd1' between the data line D1 and the pixel electrode 110-R may be reduced, and the coupling capacitance Cpd2' between the data line D1 and the pixel electrode 110-B may further be reduced, so as to reduce a difference ΔCpd'' between Cpd1' and Cpd2'. Then, according to a formula:

$$\Delta V = \frac{\Delta C pd}{Cst + Clc + \Delta C pd},$$

a voltage pull difference ΔV of the data line D1 to the pixel electrode 110-R and the pixel electrode 110-B may further be reduced.

Optionally, during specific implementation, in the embodiments of the present disclosure, as shown in FIG. 4, for a same data line, protrusions of the plurality of first concave-convex structures 130 and protrusions of the plurality of second concave-convex structures 140 may be arranged correspondingly, and recesses of the plurality of first concave-convex structures 130 and recesses of the plurality of second concave-convex structures 140 may be arranged correspondingly. Illustratively, with the data line D1 as an example, the corresponding arrangement of the protrusions of the plurality of first concave-convex structures 130 and the protrusions of the plurality of second concave-convex structures 140 refers to that the protrusions of the plurality of first concave-convex structures 130 are separated in an extending direction of the same data line, and a recess is arranged between every two protrusions; the protrusions of the plurality of second concave-convex structures 140 are separated in the extending direction of the same data line, and a recess is arranged between every two protrusions. Further, the protrusions of the plurality of first concave-convex structures 130 and the protrusions of the plurality of second concave-convex structures 140 extend substantially in a straight line along a row direction of the sub-pixels spx.

Alternatively, optionally, during specific implementation, in the embodiments of the present disclosure, as shown in FIG. 5, for a same data line, protrusions of the plurality of first concave-convex structures 130 and recesses of the plurality of second concave-convex structures 140 may be arranged correspondingly, and recesses of the plurality of first concave-convex structures 130 and protrusions of the plurality of second concave-convex structures 140 may be arranged correspondingly. Illustratively, with the data line D1 as an example, the corresponding arrangement of the protrusions of the plurality of first concave-convex structures 130 and the protrusions of the plurality of second concave-convex structures 140 refers to that the protrusions of the plurality of first concave-convex structures 130 are separated in an extending direction of the same data line, and a recess is arranged between every two protrusions; the protrusions of the plurality of second concave-convex structures 140 are separated in the extending direction of the same data line, and a recess is arranged between every two protrusions. Further, the protrusions of the plurality of first concave-convex structures 130 and the recesses of the plurality of second concave-convex structures 140 extend substantially in a straight line along a row direction of the sub-pixels spx, and the recesses of the plurality of first concave-convex structures 130 and the protrusions of the plurality of second concave-convex structures 140 extend substantially in a straight line along the row direction of the sub-pixels spx.

Optionally, during specific implementation, in the embodiments of the present disclosure, as shown in FIGS. 3-5, at least one of the first concave-convex structures 130 and the second concave-convex structures 140 may be integrally formed along with the data line. Illustratively, each of the plurality of first concave-convex structures 130 and each of the plurality of second concave-convex structures 140 are integrally formed along with the data line. In this way, the patterns of the plurality of first concave-convex structures 130, the plurality of second concave-convex structures 140 and the data lines may be formed via one composition process, so as to reduce technological process steps.

Optionally, during specific implementation, in the embodiments of the present disclosure, as shown in FIG. 5, for a same data line, distances W1 between orthographic projections of centers of any two adjacent recesses in the plurality of the first concave-convex structures 130 on the substrate 100 are equal substantially. Furthermore, for a same data line, distances W2 between orthographic projections of centers of any two adjacent recesses in the plurality of the second concave-convex structures 140 on the substrate 100 are equal substantially. Further, the distances W1 between the orthographic projections of the centers of any two adjacent recesses in the first concave-convex structures 130 on the substrate 100 may be equal to the distances W2 between the orthographic projections of the centers of any two adjacent recesses in the second concave-convex structures 140 on the substrate 100 substantially.

Optionally, during specific implementation, in the embodiments of the present disclosure, a pattern of orthographic projections of at least one of the first concave-convex structures 130 and the second concave-convex structures 140 on the substrate 100 may include: a rampart pattern, a fishbone pattern, a sawtooth waveform pattern or a wave pattern. Illustratively, as shown in FIGS. 3 and 5, the orthographic projections of the first concave-convex structures 130 and the second concave-convex structures 140 on the substrate 100 may have a rampart pattern. As shown in FIG. 4, the orthographic projections of the first concave-convex structures 130 and the second concave-convex structures 140 on the substrate 100 may further have a fishbone pattern. Certainly, in practical applications, a specific embodiment mode of the patterns of the orthographic projections of the first concave-convex structures 130 and the second concave-convex structures 140 on the substrate 100 may be designed and determined according to requirements of practical applications, which is not limited herein.

During specific implementation, in the embodiments of the present disclosure, the orthographic projections of the plurality of second concave-convex structures 140 on the substrate 100 may have the same pattern as the orthographic projections of the plurality of first concave-convex structures 130 on the substrate 100. Illustratively, as shown in FIG. 5, the orthographic projections of the first concave-convex structures 130 and the second concave-convex structures 140 on the substrate 100 may both have a rampart pattern. As shown in FIG. 4, the orthographic projections of the first concave-convex structures 130 and the second concave-convex structures 140 on the substrate 100 may further both have a fishbone pattern.

It is to be noted that in a practical process, due to limitations of process conditions or other factors, the same in the above features are not completely identical, and some deviations may be made, so long as the above conditions are substantially satisfied, the same relation between the features falls within the scope of protection of the present disclosure. For example, the same described above may be the same allowed within an allowable range of error.

Based on the same inventive concept, the embodiments of the present disclosure further provide a display panel. The display panel includes an opposing substrate and a display substrate opposite to the display substrate, and a liquid crystal layer packaged between the opposing substrate and the display substrate, the display substrate is any one of the above display substrates provided in the embodiments of the present disclosure. The principle for solving problems of the display panel is similar to that of the foregoing display substrate. Therefore, reference may be made to the implementation of the foregoing display substrate for the implementation of the display panel, and similarities will not be described in detail herein.

Based on the same inventive concept, the embodiments of the present disclosure further provide a display apparatus. The display apparatus includes the display panel provided in the embodiments of the present disclosure. The principle for solving problems of the display apparatus is similar to that of the foregoing display panel. Therefore, reference may be made to the implementation of the foregoing display panel for the implementation of the display apparatus, and similarities will not be described in detail herein.

During specific implementation, in the embodiments of the present disclosure, the display apparatus may be any product or component with a display function, for example, a mobile phone, a tablet personal computer, a television, a display, a notebook computer, a digital photo frame, a navigator, etc. Other essential components of the display apparatus will be understood by those of ordinary skill in the art, and are not described in detail herein, nor are they intended to be limiting of the present disclosure.

According to the display substrate, the display panel and the display apparatus, the distances between the pixel electrodes and the data lines are inversely proportional to the magnitudes of the coupling capacitances between the pixel electrodes and the data lines, and a side of the orthographic projections of the at least one of the plurality of data lines on the substrate facing the orthographic projections of the sub-pixels electrically connected with the at least one of the plurality of date lines has a plurality of first concave-convex structures. In this way, the distances between the data lines and the sub-pixels electrically connected thereto increase at recesses in the first concave-convex structures, such that the coupling capacitances between the data lines and the sub-pixels electrically connected thereto are reduced, so as to make the coupling capacitances between the data lines and the sub-pixels electrically connected thereto approach, to the greatest possible extent, coupling capacitances between the data lines and adjacent sub-pixels not electrically connected thereto, thereby reducing differences between the coupling capacitances between the data lines and the sub-pixels electrically connected thereto and the coupling capacitances between the data lines and the adjacent sub-pixels not electrically connected thereto, and improving the uniformity of picture display.

Apparently, those skilled in the art can make various modifications and variations to the present disclosure without departing from the spirit and scope of the present disclosure. In this way, if amendments and variations to the present disclosure fall within the scope of the claims of the present disclosure and the equivalents thereof, it is intended that the present disclosure also encompasses these amendments and variations.

What is claimed is:

1. A display substrate, comprising:
   a substrate having a display area;
   a plurality of sub-pixels arranged in an array and located in the display area of the substrate; and
   a plurality of data lines arranged in the display area of the substrate;
   wherein
   the plurality of data lines extend in a column direction of the sub-pixels, and a column of sub-pixels are electrically connected with at least one of the plurality of data lines; and
   for at least one of the plurality of data lines, a side of an orthographic projection of the at least one of the plurality of data lines on the substrate facing orthographic projections of sub-pixels electrically connected with the at least one of the plurality of data lines has a plurality of first concave-convex structures;
   wherein the plurality of first concave-convex structures each is provided with an edge parallel to the column direction and an edge perpendicular to the column direction;
   wherein a side of the orthographic projection of the at least one of the plurality of data lines on the substrate facing away from the orthographic projections of sub-pixels electrically connected with the at least one of the plurality of data lines has a plurality of second concave-convex structures; and
   wherein for a same data line, protrusions of the plurality of first concave-convex structures and recesses of the plurality of second concave-convex structures are arranged correspondingly, and recesses of the plurality of first concave-convex structures and protrusions of the plurality of second concave-convex structures are arranged correspondingly.

2. The display substrate according to claim 1, wherein at least one of the first concave-convex structures and the second concave-convex structures is integrally formed along with the data line.

3. The display substrate according to claim 1, wherein for a same data line, distances between orthographic projections of centers of any two adjacent recesses in the plurality of first concave-convex structures on the substrate are equal; and for a same data line, distances between orthographic projections of centers of any two adjacent recesses in the plurality of second concave-convex structures on the substrate are equal.

4. The display substrate according to claim 3, wherein orthographic projections of at least one of the first concave-convex structures and the second concave-convex structures on the substrate form at least one of: a rectangular waveform pattern, or a fishbone pattern.

5. The display substrate according to claim 4, wherein orthographic projections of the plurality of second concave-convex structures on the substrate have a same pattern as orthographic projections of the plurality of first concave-convex structures on the substrate.

6. A display panel, comprising:
a display substrate;
an opposing substrate opposite to the display substrate; and
a liquid crystal layer packaged between the display substrate and the opposing substrate,
wherein the display substrate comprises:
a substrate having a display area;
a plurality of sub-pixels arranged in an array and located in the display area of the substrate; and
a plurality of data lines arranged in the display area of the substrate; wherein
the plurality of data lines extend in a column direction of the sub-pixels, and a column of sub-pixels are electrically connected with at least one of the plurality of data lines; and
for at least one of the plurality of data lines, a side of an orthographic projection of the at least one of the plurality of data lines on the substrate facing orthographic projections of sub-pixels electrically connected with the at least one of the plurality of data lines has a plurality of first concave-convex structures;
wherein the plurality of first concave-convex structures each is provided with an edge parallel to the column direction and an edge perpendicular to the column direction;
wherein a side of the orthographic projection of the at least one of the plurality of data lines on the substrate facing away from the orthographic projections of sub-pixels electrically connected with the at least one of the plurality of data lines has a plurality of second concave-convex structures; and
wherein for a same data line, protrusions of the plurality of first concave-convex structures and recesses of the plurality of second concave-convex structures are arranged correspondingly, and recesses of the plurality of first concave-convex structures and protrusions of the plurality of second concave-convex structures are arranged correspondingly.

7. A display apparatus, comprising the display panel according to claim 6.

8. The display panel according to claim 6, wherein at least one of the first concave-convex structures and the second concave-convex structures is integrally formed along with the data line.

9. The display panel according to claim 6, wherein for a same data line, distances between orthographic projections of centers of any two adjacent recesses in the plurality of first concave-convex structures on the substrate are equal; and for a same data line, distances between orthographic projections of centers of any two adjacent recesses in the plurality of second concave-convex structures on the substrate are equal.

10. The display panel according to claim 9, wherein orthographic projections of at least one of the first concave-convex structures and the second concave-convex structures on the substrate form at least one of: a rectangular waveform pattern, or a fishbone pattern.

11. The display panel according to claim 10, wherein orthographic projections of the plurality of second concave-convex structures on the substrate have a same pattern as orthographic projections of the plurality of first concave-convex structures on the substrate.

* * * * *